(12) United States Patent
Östman et al.

(10) Patent No.: US 6,728,228 B1
(45) Date of Patent: Apr. 27, 2004

(54) METHOD AND SYSTEM FOR MEASURING AND REPORTING RECEIVED SIGNAL STRENGTH

(75) Inventors: Thomas Östman, Spånga (SE); Bo Hagerman, Stockholm (SE); Andrew Forde, Portmarnock (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/475,640

(22) Filed: Dec. 30, 1999

Related U.S. Application Data

(60) Provisional application No. 60/154,783, filed on Sep. 26, 1999.

(51) Int. Cl.$^7$ .............................. H04Q 7/00; H04J 3/00
(52) U.S. Cl. .................... 370/332; 370/336; 455/226.1; 455/437
(58) Field of Search ................................ 370/321, 331, 370/332, 333, 336, 347, 337, 431; 455/522, 507, 517, 509, 562, 63, 69, 127, 13.4, 226.1, 226.2, 437

(56) References Cited

U.S. PATENT DOCUMENTS

| | | | |
|---|---|---|---|
| 5,564,075 A | | 10/1996 | Gourgue |
| 5,670,964 A | * | 9/1997 | Dent .......................... 342/457 |
| 5,682,489 A | * | 10/1997 | Harrow et al. .............. 455/522 |
| 5,740,535 A | * | 4/1998 | Rune .......................... 455/437 |
| 5,870,393 A | * | 2/1999 | Yano et al. ................. 370/335 |
| 5,933,788 A | * | 8/1999 | Faerber et al. .............. 455/562 |
| 5,960,335 A | * | 9/1999 | Umemoto et al. ....... 455/226.2 |

FOREIGN PATENT DOCUMENTS

| | | |
|---|---|---|
| EP | 0755133 A2 | 1/1997 |
| WO | 97/31502 | 8/1997 |
| WO | 98/30043 | 7/1998 |
| WO | 98/30044 | 7/1998 |

* cited by examiner

Primary Examiner—Duc Ho

(57) ABSTRACT

In a Time Division Multiple Access based radio telecommunications system that employs downlink power control, received signal strength information is measured and reported. A downlink data signal is transmitted from a base station to a mobile station during a first timeslot. A control channel signal or a dedicated traffic channel signal having equivalent output power behavior as the control channel, is transmitted from the base station throughout a cell in which the mobile station is operating. At the mobile station, a received signal strength of the control channel signal or the dedicated traffic channel signal is measured. The received signal strength may be measured in period between when the mobile station transmits and receives or in a period between when the mobile station received and transmits. The received signal strength may be measured during the first timeslot or during a timeslot other than said first timeslot. The received signal strength may also be measured during a time period associated with Mobile Assisted Handover (MAHO) measurements, the MAHO list including the control channel and/or the dedicated traffic channel. The received signal strength as measured by the mobile station is reported to the base station. The measured received signal strength is compensated for to obtain signal strength information associated with the downlink data signal received by the mobile station during the first timeslot.

44 Claims, 3 Drawing Sheets

METHOD AND SYSTEM FOR MEASURING AND REPORTING RECEIVED SIGNAL STRENGTH

The present invention generally relates to the field of radio telecommunications. More particularly, the present invention relates to downlink power level control in a time division multiple access (TDMA) based radio telecommunications system.

BACKGROUND

In a telecommunications system, e.g., a cellular radio system, any one of several access strategies may be employed, for example, frequency division multiple access (FDMA), code division multiple access (CDMA), or time division multiple access (TDMA).

In North America, a digital cellular radiotelephone system using TDMA is called the Digital Advanced Mobile Phone System (D-AMPS), some of the characteristics of which are specified in the TIA/EIA/IS-136 standard published by the Telecommunications Industry Association and Electronic Industries Association (TIA/EIA). Another digital communication system, using direct sequence CDMA, is specified by the TIA/EIA/IS-95 standard. There are also frequency hopping TDMA and CDMA communication systems, one of which is specified by the EIA SP 3389 standard (PCS 1900). The PCS 1900 standard is an implementation of the GSM system, which is common outside North America, that has been introduced for personal communication services (PCS) systems.

In an FDMA based system, the frequency spectrum is divided into a number of disjunctive frequency bands, where each band serves as a separate radio channel. In a system that employs CDMA, different modulation or spreading codes are used to distinguish the various radio channels.

In a TDMA based system, however, the time domain is divided into time frames. Each time frame is then further divided into a number of timeslots, for example, three timeslots. Thus, each carrier frequency-timeslot combination constitutes a different physical channel over which a communications signal burst can be transmitted. In a cellular radio telecommunications system, a communications signal burst transmitted from a mobile station to a corresponding radio base station is referred to as an uplink burst. In contrast, a communications signal burst transmitted from the radio base station to the mobile station is referred to as a downlink burst.

FIG. 1 illustrates a conventional TDMA cellular radio system including cells C1–C10 and base stations B1–B10, one base station per cell. The base stations are typically situated in the vicinity of the cell center and have omnidirectional antennas. The base stations of adjacent cells may, however, be colocated in the vicinity of cell borders and have directional antennas, as is well known to those skilled in the art.

The system also includes mobile stations M1–M10 that are movable within a cell and from one cell to another. A mobile switching center (MSC) is connected to the base stations by, e.g., cables or fixed radio links. The MSC is also connected to a fixed public switching telephone network or a similar fixed network with ISDN facilities. In addition to the MSC illustrated in FIG. 1, there may also be other mobile switching centers.

Power control, i.e., the ability to modify or adjust the power levels associated with communications signal bursts, particularly, downlink communications signal bursts transmitted from a base station to a mobile station, is important in a telecommunications system to insure that the signal quality associated with a given channel is adequate. Power control also helps improve the spectral efficiency of the system as a whole by balancing average, system-wide signal quality and system capacity and effectively limiting the emitted energy that acts as interference at other mobile.

Downlink power control relies on received signal quality and received signal strength as reported from the mobile station in order to regulate the base station output power so that minimum requirements for speech quality are fulfilled, but energy emitted is minimized to keep interference low. For this purpose, algorithms are implemented in the base stations, which use parameters transmitted from the mobile station, e.g., the measured quality and the measured RSSI of the downlink data, and radio network management parameters transmitted from the MSC, e.g., acceptable speech quality. A more detailed description of downlink power control is provided in U.S. Pat. No. 6,529,494, issued Mar. 4, 2003, and herein Incorporated by reference.

In accordance with the present TDMA standard, TIA/EIA 136 Rev. A, downlink transmission power level remains constant throughout each time frame. Thus, a mobile station receiving a downlink burst during a given timeslot expects the power level of the received burst to remain constant, or nearly constant, over the timeslot, not withstanding attenuations due to fading. However, it is highly probable that the TDMA standard will soon incorporate downlink power control, where the transmission power level from timeslot to timeslot may be adjusted, to achieve better signal quality and spectral efficiency, as stated above.

Downlink power control must be compatible with the handoff procedure used for the cellular system, e.g., Mobile Assisted Handoff (MAHO). According to this procedure, the MSC orders the mobile station to continuously make signal strength measurements on channels other than the channel assigned to the mobile station. This is done by transmitting a MAHO list to the mobile station via the base station, as the communication is set up. The list is defined for each cell and typically includes control channels of neighboring cells. In a TDMA system, the MAHO list may include, e.g., 24 or 12 different channels. The mobile station makes the measurements in a time period not used for communication and reports the measurements back to the base station, which transmits the information to the MSC. Upon a handoff request, the MSC chooses the handoff target cell based on the control channel with the highest signal strength. Other uses for the MAHO list have been suggested, as in WO 98/30043 and WO 97/31502.

One problem with implementing downlink power control in TDMA based systems is that, for handoff purposes, mobile stations are required to measure, and thereafter report, approximately once every second, received signal strength information (RSSI), as one skilled in the art will readily appreciate. Due to the fact that the current TDMA standard maintains transmission power level constant throughout each time frame for a given carrier frequency, and because the TDMA standard does not define when or how RSSI is to be measured, some mobile stations are designed to measure RSSI during the timeslot in which they are receiving downlink data, while other mobile stations are designed to measure RSSI during adjacent timeslots. Moreover, some mobile stations are designed such that they sample received signal strength during a portion of a timeslot, while other mobile stations sample received signal strength over the entire timeslot, and therefrom, calculate an average signal strength value. If the TDMA standard incorporates downlink power control, mobile stations which are designed in accordance with the present TDMA standards (i.e., legacy mobile stations), particularly those mobile stations that are not designed to measure RSSI during the timeslot in which they are receiving downlink data, may be unable to accurately measure and report RSSI, because the RSSI measured in timeslots not dedicated to the mobile station may not be a good indicator of the actual RSSI in the timeslot dedicated to the mobile station.

Also, if downlink power control in each timeslot is introduced, the differences in measuring RSSI may become a problem. Mobile stations that report similar signal strengths in timeslots in which downlink power control is not used will report different signal strengths timeslots in which downlink power control is used. This could make the downlink power control functionality difficult to use.

Accordingly, it would be highly desirable to provide a technique whereby any legacy mobile station is capable of measuring and reporting RSSI accurately while operating in a TDMA system that employs downlink power control.

SUMMARY

It is therefore an object of the present invention to provide a technique for accurately measuring and reporting RSSI.

According to exemplary embodiments, this and other objects are met by a method and system, in a Time Division Multiple Access based radio telecommunications system that employs downlink power control, of measuring and reporting received signal strength information. A downlink data signal is transmitted from a base station to a mobile station during a first timeslot. A control channel signal or a dedicated traffic channel signal with an equivalent output power behavior as the control channel signal is transmitted from the base station throughout a cell in which the mobile station is operating. At the mobile station, a received signal strength of the control channel signal or the dedicated traffic channel signal is measured. The received signal strength as measured by the mobile station is reported to the base station. The measured received signal strength is compensated for to obtain signal strength information associated with the downlink data signal received by the mobile station during the first timeslot.

The measured received signal strength may be compensated for by subtracting an attenuation level associated with the downlink data signal from the received signal strength measurement associated with the control channel signal or the dedicated traffic channel signal. Alternately, the difference in output power between the control channel signal or the dedicated traffic channel signal and the downlink data signal may be added to the received signal strength measurement associated with the control channel signal or the dedicated traffic channel signal. If different antenna systems are used for transmitting the control channel signal and the downlink data signal, different antenna system gains may be compensated for. If different frequency bands are used for transmitting the downlink data signal and the control channel signal, different propagations at the different frequencies may be compensated for.

The received signal strength of the control channel signal or the dedicated traffic channel signal may be measured during a period between when the mobile station transmits and receives or during a period between when the mobile station receives and transmits. The received signal strength may be measured during the first timeslot or during a timeslot other than the first timeslot. The received signal strength may also be measured during a time period associated with Mobile Assisted Handover (MAHO) measurements, MAHO measurements being performed for channels in a MAHO list that includes the base station's control channel and/or the dedicated traffic channel.

DETAILED DESCRIPTION

Figure 1:
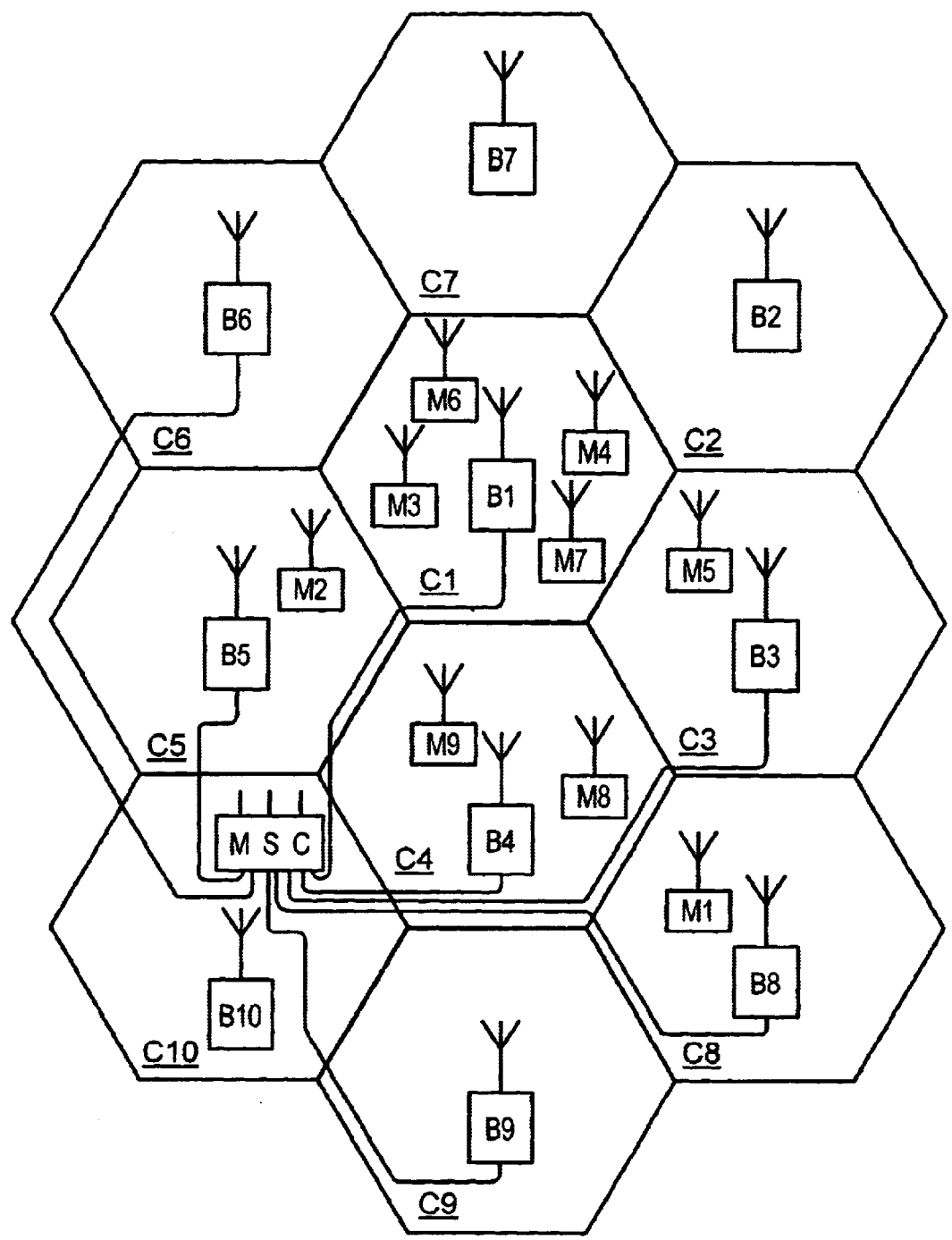
FIG. 1 illustrates a conventional cellular mobile radio system.

The present invention provides a technique that allows mobile stations designed to operate in a TDMA based telecommunications system which does not employ downlink power control to measure received signal strength information (RSSI) in a TDMA based telecommunications system that does employ downlink power control. More particularly, the present invention provides a technique that enables mobile stations operating in a TDMA based telecommunications system that employs downlink power control to measure RSSI, regardless of whether those mobile stations are designed to measure RSSI during the timeslot in which they are receiving downlink data, or a portion thereof, or whether they are designed to measure RSSI during an adjacent timeslot, or a portion thereof.

According to an exemplary embodiment, this is accomplished by providing a technique that uses a time period in the control channel, e.g., a time period associated with MAHO measurements, to measure RSSI. One reason why this is feasible is that all mobile stations are designed with the capacity to measure the strength of the received signal associated with the control channel. Moreover, the signal associated with the control channel is always transmitted at constant power, though it may be attenuated for balancing the coverage area.

More specifically, the RSSI associated with the control channel is measured by a given mobile station operating in a TDMA based telecommunications system that employs downlink power control, despite the fact that the mobile station is designed to operate in a TDMA based telecommunications system that does not employ downlink power control. The mobile station then reports the measured RSSI for the control channel to the corresponding base station. According to exemplary embodiments, the measured RSSI for the control channel may be compensated for to obtain the measured RSSI for the downlink data.

For example, if the output power of the downlink data is less than the output power of the control channel signal, the level of attenuation associated with the timeslot in which the mobile station is receiving downlink data may be subtracted from the RSSI reported by the mobile station. The difference reflects the signal strength of the signal received by the mobile station during the timeslot in which the mobile station is receiving downlink data.

Alternately, if the output power of the downlink data is greater than the output power of the control channel signal, the difference between the output power level of the downlink data and the output power level of the control channel signal may be added to the RSSI reported by the mobile station.

The measured RSSI of the control channel signal may also be compensated for if different antenna systems are used to transmit the control channel signal, so that the different antenna system gains are taken into account. Also, if the downlink data and the control channel signals are transmitted at different frequencies, for example in a mixed 850 MHz and 1900 MHz system, a compensation factor is needed to compensate for the different propagation and different frequencies.

Because the mobile station measures the RSSI associated with the control channel, it does not matter whether the mobile station is designed to measure RSSI during an adjacent timeslot, or the timeslot in which it is receiving downlink data, since the power level associated with the control channel is not subject to downlink power control, as explained above. Therefore, mobile stations designed in accordance with the current TDMA standard (i.e., so-called legacy mobile stations) are able to operate in a TDMA based system that employs downlink power control.

Figure 2:
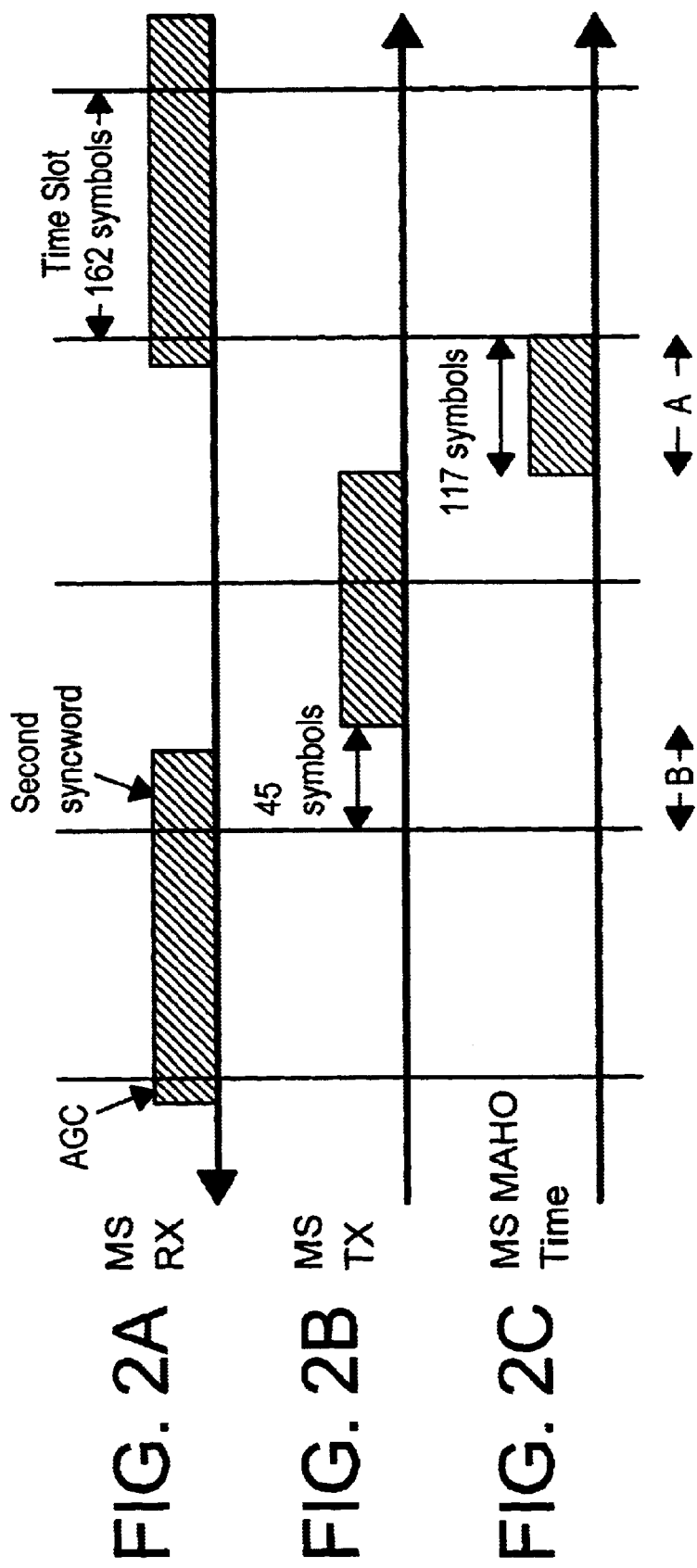
FIGS. 2A–2C illustrate a mobile station utilization cycle and base station downlink timeslot transmit control according to exemplary embodiments.

FIGS. 2A–2C illustrate the utilization cycle of an exemplary mobile station and downlink timeslot transmit control of an exemplary base station according to exemplary embodiments. As shown in FIG. 2A, a mobile station (MS) receives information including an AGC portion, a first synchronization word portion, a data portion, and a second synchronization word portion from a base station (BS). The data portion is received over a timeslot having a length of, e.g., 162 symbols. As shown in FIG. 2B, a period corresponding to the transmission of 45 symbols is required before the mobile station can transmit data. Thereafter, as shown in FIG. 2C, a period corresponding to the transmission of 117 symbols is required before the mobile station can, once again, receive data. The period depicted in FIG. 2C corresponds to a time period associated with MAHO measurements.

The specific time period during which the mobile station measures the RSSI associated with the control channel may vary depending on the mobile station's design. For example, the measurement period may be that between transmitting and receiving, or the time period associated with MAHO measurements, as indicated by "A". This may be implemented by including the serving base station's control channel in the MAHO list instead of or in addition to one of the neighboring cell's control channels. This may be set up by the operator on a system management level. Alternately, the measurement period may be that between receiving and transmitting, as indicated by "B".

One skilled in the art will appreciate that it is possible for the mobile station to measure RSSI at the same time it is receiving, e.g., if the mobile station employs two receivers. One skilled in the art will also appreciate that it is possible for the mobile station to measure RSSI while it is transmitting, e.g., if the mobile station employs a duplex filter.

In accordance with an alternative embodiment of the present invention, the same measurement can be made by mobile stations using a dedicated traffic channel that has an equivalent power behavior as a control channel. In this case, the transmit power level associated with the dedicated traffic channel would not be subject to downlink power control, so that it can be used for signal strength measurements. The mobile station would employ the same measurement techniques as used for the control channel. The dedicated traffic channel may be included in the MAHO list instead of or in addition to one of the neighboring cell's control channels.

Figure 3:
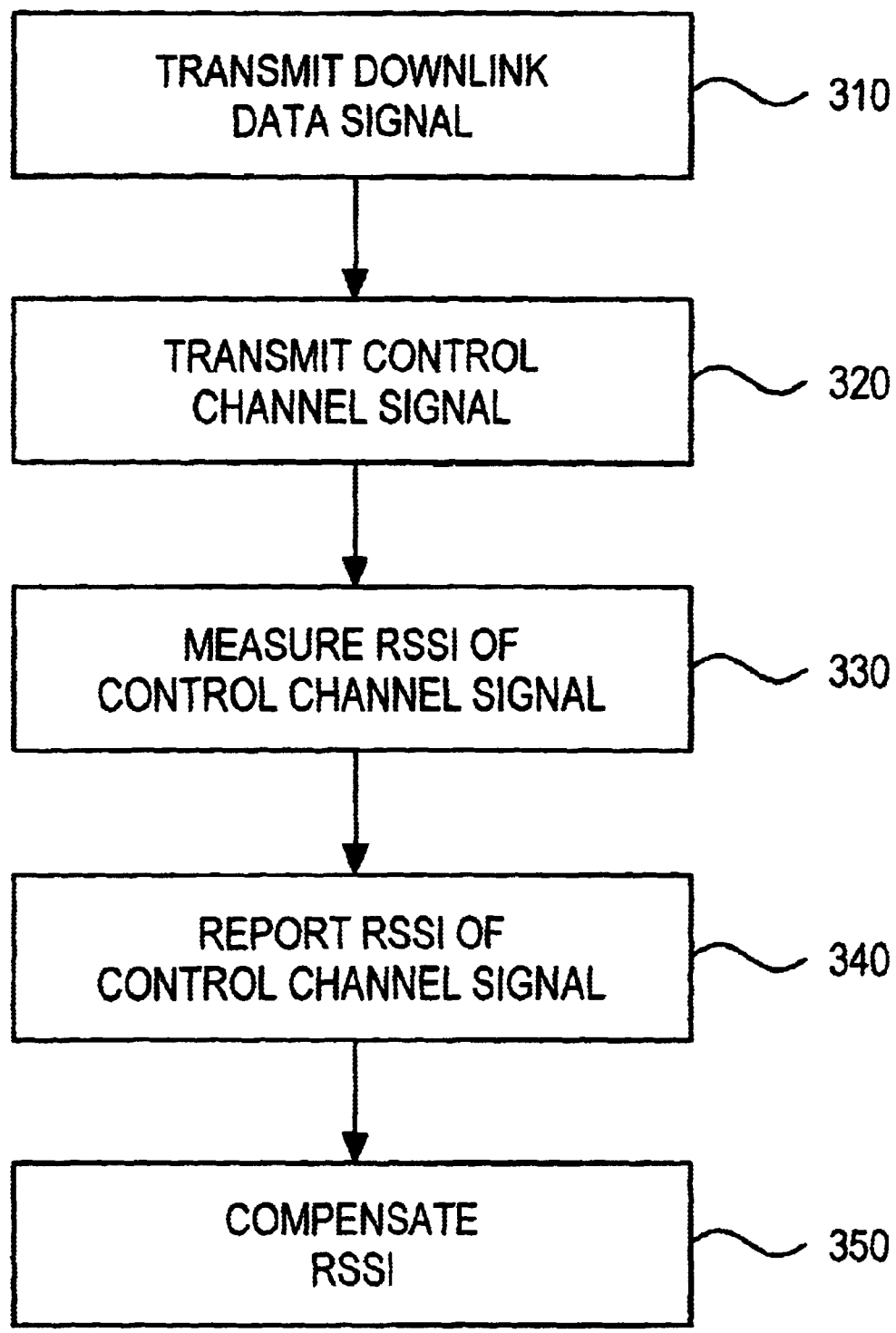
FIG. 3 illustrates a method for measuring and reporting received signal strength according to exemplary embodiments.

FIG. 3 illustrates a method for measuring and reporting received signal strength according to exemplary embodiments. The method begins at step 310, at which the downlink data signal is transmitted from the base station to the mobile station. At step 320, the control channel signal or the dedicated traffic channel signal is transmitted from the base station to the mobile station. At step 330, the RSSI of the control channel signal (or the dedicated traffic channel signal) is measured at the mobile station. This measurement may be made, e.g., during the period between which the mobile station transmits and receives (or in the time period associated with MAHO measurements), during the period between which the mobile station receives and transmits, while the mobile station transmits, or while the mobile station receives. At step 340, the measured RSSI is reported to the base station. At step 350, the measured RSSI of the control channel signal (or the dedicated traffic channel signal) is compensated for to obtain the RSSI of the downlink data signal. Step 350 may include subtracting the attenuation level of the downlink data signal from the RSSI, adding the difference between the output power level of the downlink data signal and the output power level of the control channel signal (or the dedicated traffic channel signal) to the RSSI, compensating for different antenna system gains and/or compensating for different propagations at different frequencies.

Once obtained, the RSSI of the downlink data signal may then be used to make handoff decisions and for other radio network management purposes.

According to exemplary embodiments, legacy mobile stations will be able to operate in TDMA based systems, even if the TDMA standard incorporates downlink power control as described above. In addition, by measuring signal strength on the control channel that is associated with the cell in which the mobile station is operating, the technique is independent of timeslot power control in the handoff situation.

The description above has been directed to an exemplary embodiment. However, it will be readily apparent to those skilled in the art that it is possible to embody the invention in specific forms other than as described above without departing from the spirit of the invention. The embodiment described above is illustrative and should not be considered restrictive in any way.

What is claimed is:

1. In a Time Division Multiple Access based radio telecommunications system that employs downlink power control, a method of measuring and reporting received signal strength information, said method comprising the steps of:

transmitting a downlink data signal from a base station to a mobile station during a first timeslot, said data signal being transmitted at a power level that is variable due to downlink power control;

transmitting a control channel signal from the base station throughout a cell in which the mobile station is operating, said control channel signal being transmitted at a power level that is constant;

at the mobile station, measuring a received signal strength of the control channel signal;

reporting the received signal strength of the control channel signal, as measured by the mobile station, to the base station; and compensating for the measured received signal strength of the control channel signal to derive signal strength information associated with the downlink data signal received by the mobile station during the first timeslot.

2. The method of claim 1, wherein the downlink data signal is attenuated before being transmitted, and said step of compensating comprises subtracting the attenuation level associated with the downlink data signal from the received signal strength measurement associated with the control channel signal.

3. The method of claim 1, wherein said step of compensating comprises adding a difference between an output power level of the downlink data signal and an output power level of the control channel signal to the received signal strength measurement associated with the control channel signal.

4. The method of claim 1, wherein different antenna systems are used for transmitting the control channel signal and the downlink data signal, and the step of compensating compensates for the different antenna system gains.

5. The method of claim 1, wherein different frequency bands are used for transmitting the control channel signal and the downlink data signal, and the step of compensating compensates for different propagations at different frequencies.

6. The method of claim 1, wherein said step of measuring the received signal strength of the control channel comprises the step of:

measuring the received signal strength in a period between when the mobile station transmits and when the mobile station receives.

7. The method of claim 1, wherein said step of measuring the received signal strength of the control channel comprises the step of:

measuring the received signal strength in a period between when the mobile station receives and when the mobile station transmits.

8. The method of claim 1, wherein said step of measuring the received signal strength of the control channel signal comprises the step of:

measuring the received signal strength during the first timeslot.

9. The method of claim 1, wherein said step of measuring the received signal strength of the control channel signal comprises the step of:

measuring the received signal strength during a timeslot other than said first timeslot.

10. The method of claim 1, wherein said step of measuring the received signal strength of the control channel signal comprises the step of:

measuring the received signal strength during a time period associated with Mobile Assisted Handover (MAHO) measurements.

11. The method of claim 10, wherein MAHO measurements are performed for control channels contained in a MAHO list that includes the base station's control channel.

12. The method of claim 1, wherein the step of measuring measures the received signal strength in a dedicated traffic channel having an equivalent output power behavior as the control channel.

13. The method of claim 12, wherein the downlink data signal is attenuated before being transmitted, and said step of compensating comprises subtracting the attenuation level associated with the downlink data signal from the received signal strength measurement associated with the dedicated traffic channel signal.

14. The method of claim 12, wherein said step of compensating comprises adding a difference between an output power level of the downlink data signal and an output power level of the dedicated traffic channel signal to the received signal strength measurement associated with the dedicated traffic channel signal.

15. The method of claim 12, wherein different antenna systems are used for transmitting the dedicated traffic channel signal and the downlink data signal, and the step of compensating compensates for the different antenna system gains.

16. The method of claim 12, wherein different frequency bands are used for transmitting the dedicated traffic channel signal and the downlink data signal, and the step of compensating compensates for different propagations at different frequencies.

17. The method of claim 12, wherein said step of measuring the received signal strength of the dedicated traffic channel signal comprises the step of:

measuring the received signal strength in a period between when the mobile station transmits and when the mobile station receives.

18. The method of claim 12, wherein said step of measuring the received signal strength of the dedicated traffic channel signal comprises the step of:

measuring the received signal strength in a period between when the mobile station receives and when the mobile station transmits.

19. The method of claim 12, wherein said step of measuring the received signal strength of the dedicated traffic channel signal comprises the step of:

measuring the received signal strength during the first timeslot.

20. The method of claim 12, wherein said step of measuring the received signal strength of the dedicated traffic channel signal comprises the step of:

measuring the received signal strength during a timeslot other than said first timeslot.

21. The method of claim 12, wherein said step of measuring the received signal strength of the dedicated traffic channel signal comprises the step of:

measuring the received signal strength during a time period associated with Mobile Assisted Handover (MAHO) measurements.

22. The method of claim 21, wherein MAHO measurements are performed for channels contained in a MAHO list that includes the a dedicated traffic channel.

23. In a Time Division Multiple Access based radio telecommunications system that employs downlink power control, a system for measuring and reporting received signal strength information, comprising:

means for transmitting a downlink data signal from a base station to a mobile station during a first timeslot at a power level that is variable due to downlink power control;

means for transmitting a control channel signal from the base station throughout a cell in which the mobile station is operating, said control channel signal being transmitted at a power level that is constant;

at the mobile station, means for measuring a received signal strength of the control channel signal;

means for reporting the received signal strength of the control channel signal, as measured by the mobile station, to the base station; and means for compensating for the received signal strength of the control channel signal to obtain signal strength information associated with the downlink data signal received by the mobile station during the first timeslot.

24. The system of claim 23, wherein the downlink data signal is attenuated before being transmitted, and the compensating means comprises:

means for subtracting the attenuation level associated with the downlink data signal from the received signal strength measurement associated with the control channel signal.

25. The system of claim 23, wherein the compensating means adds a difference between an output power level of the downlink data signal and an output power level of the control channel signal to the received signal strength measurement associated with the control channel signal.

26. The system of claim 23, wherein different antenna systems are used for transmitting the control channel signal and the downlink data signal, and the compensating means compensates for the different antenna system gains.

27. The system of claim 23, wherein different frequency bands are used for transmitting the control channel signal and the downlink data signal, and the compensating means compensates for different propagations at different frequencies.

28. The system of claim 23, wherein the means for measuring the received signal strength of the control channel signal comprises:

means for measuring the received signal strength in a period between when the mobile station transmits and when the mobile station receives.

29. The system of claim 23, wherein the means for measuring the received signal strength of the control channel signal comprises:

means for measuring the received signal strength in a period between when the mobile station receives and when the mobile station transmits.

30. The system of claim 23, wherein the means for measuring the received signal strength of the control channel signal comprises:

means for measuring the received signal strength during the first timeslot.

31. The system of claim 23, wherein the means for measuring the received signal strength of the control channel signal comprises:

means for measuring the received signal strength during a timeslot other than said first timeslot.

32. The system of claim 23, wherein the means for measuring the received signal strength of the control channel signal comprises:

means for measuring the received signal strength during a time period associated with Mobile Assisted Handover (MAHO) measurements.

33. The system of claim 32, wherein MAHO measurements are performed for control channels contained in a MAHO list that includes the base station's control channel.

34. The system of claim 23, wherein the measuring means measures the received signal strength in a dedicated traffic channel having an equivalent output power behavior as the control channel.

35. The system of claim 34, wherein the downlink data signal is attenuated before being transmitted, and the compensating means comprises:

means for subtracting the attenuation level associated with the downlink data signal from the received signal strength measurement associated with the dedicated traffic channel signal.

36. The system of claim 34, wherein the compensating means adds a difference between an output power level of the downlink date signal and an output power level of the control channel signal to the received signal strength measurement associated with the dedicated traffic channel signal.

37. The system of claim 34, wherein different antenna systems are used for transmitting the dedicated traffic channel signal and the downlink data signal, and the compensating means compensates for the different antenna system gains.

38. The system of claim 34, wherein different frequency bands are used for transmitting the dedicated traffic channel signal and the downlink data signal, and the compensating means compensates for different propagations at different frequencies.

39. The system of claim 34, wherein the means for measuring the received signal strength of the dedicated traffic channel signal comprises:

means for measuring the received signal strength in a period between when the mobile station transmits and when the mobile station receives.

40. The system of claim 34, wherein the means for measuring the received signal strength of the dedicated traffic channel signal comprises:

means for measuring the received signal strength in a period between when the mobile station receives and when the mobile station transmits.

41. The system of claim 34, wherein the means for measuring the received signal strength of the dedicated traffic channel signal comprises:

means for measuring the received signal strength during the first timeslot.

42. The system of claim 34, wherein the means for measuring the received signal strength of the dedicated traffic channel signal comprises:

means for measuring the received signal strength during a timeslot other than said first timeslot.

43. The system of claim 34, wherein the means for measuring the received signal strength of the dedicated traffic channel signal comprises:

means for measuring the received signal strength during a time period associated with Mobile Assisted Handoff (MAHO) measurements.

44. The system of claim 43, wherein MAHO measurements are performed for channels contained in a MAHO list that includes the dedicated traffic channel.

* * * * *